United States Patent [19]
Schurgin

[11] 3,826,579
[45] July 30, 1974

[54] MICROFILM NAVIGATION SYSTEM

[76] Inventor: Herbert L. Schurgin, 26 Juniper St., Wenham, Mass. 01984

[22] Filed: Mar. 5, 1973

[21] Appl. No.: 338,331

[52] U.S. Cl............... 356/247, 350/239, 353/12, 353/39
[51] Int. Cl. .......................................... G03b 21/11
[58] Field of Search .......... 350/239; 353/11, 12, 13, 353/14, 39; 356/247

[56] References Cited
UNITED STATES PATENTS
3,094,781   6/1963   Vangor ...................... 350/239 X Primary Examiner—Ronald L. Wibert
Assistant Examiner—F. L. Evans
Attorney, Agent, or Firm—Weingarten, Maxham & Schurgin

[57] ABSTRACT

A compact portable microfiche chart display system especially adapted for use in marine navigation and piloting. A projection screen on which a chart is displayed has provided thereon a compass rose and one or more rotatable course indicators to enable plotting to be made directly in association with the displayed chart. The system can be oriented with the projected chart in a horizontal plane such that the course indicator can be employed to take pelorus sightings in direct relation to charted position.

7 Claims, 2 Drawing Figures

MICROFILM NAVIGATION SYSTEM

FIELD OF THE INVENTION

This invention relates to navigation systems and more particularly to a system employing a projected display of a navigation chart from a photographic film source.

BACKGROUND OF THE INVENTION

Nautical charts used for navigation and piloting are rather large and can be employed or opened in a completely flat state only on larger and usually commercial vessels. In smaller vessels where there is insufficient room for a chart table, the chart is usually folded to display only a particular area of present use. Folding of the chart of course reduces its legibility in the crease areas and requires often considerable manipulation to change from one folded section to another. It has been suggested to embody a navigation chart in microfilm form for projection onto a viewing screen; however, apparatus which has been proposed has not been satisfactory for many purposes and has not allowed practical plotting of courses on the projected chart.

SUMMARY OF THE INVENTION

In accordance with the present invention, nautical charts are provided in photographic film form for projection on a display screen on which is provided a compass rose and associated rotatable course indicator for direct navigation and plotting in association with the projected chart display. The apparatus can be of extremely small size for convenient use and mounting in even small pleasure vessels, and an extensive collection of charts can easily be stored aboard the vessel. Typically, the charts are provided in the form of a microfiche which includes one or more charts which can be of different scales or of related areas and which can include associated information such as tide and weather data for a particular area. The apparatus is adjustably mounted to enable horizontal disposition of the projected chart such that the compass circle and rotatable indicator associated with the projected chart can be employed as a pelorus to take direct azimuth sightings.

DESCRIPTION OF THE DRAWINGS

The invention will be more fully understood from the following detailed description taken in conjunction with the accompanying drawings in which.

DETAILED DESCRIPTION OF THE INVENTION

Figure 1:
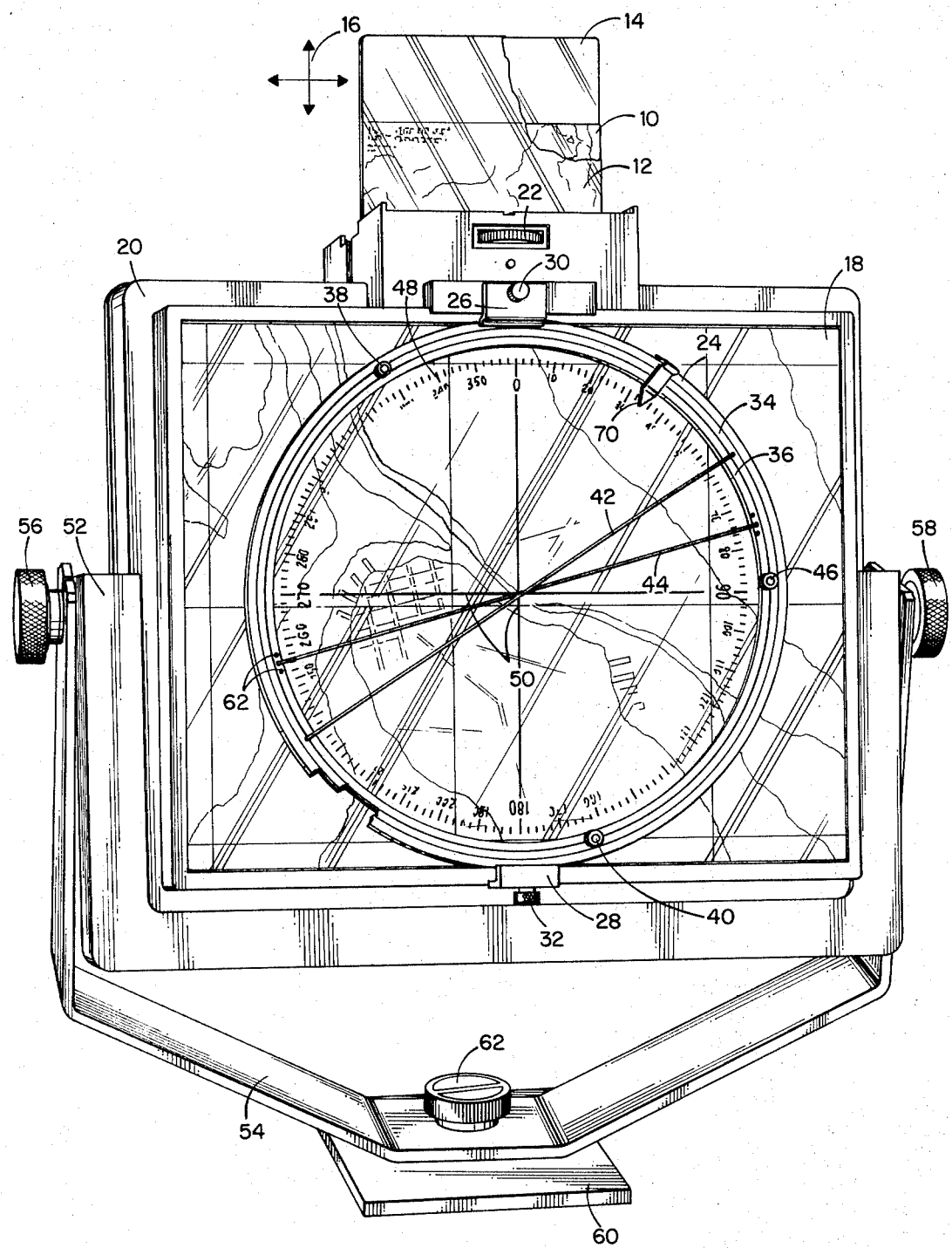
FIG. 1 is a pictorial view of projection and navigation apparatus according to the invention.
Figure 2:
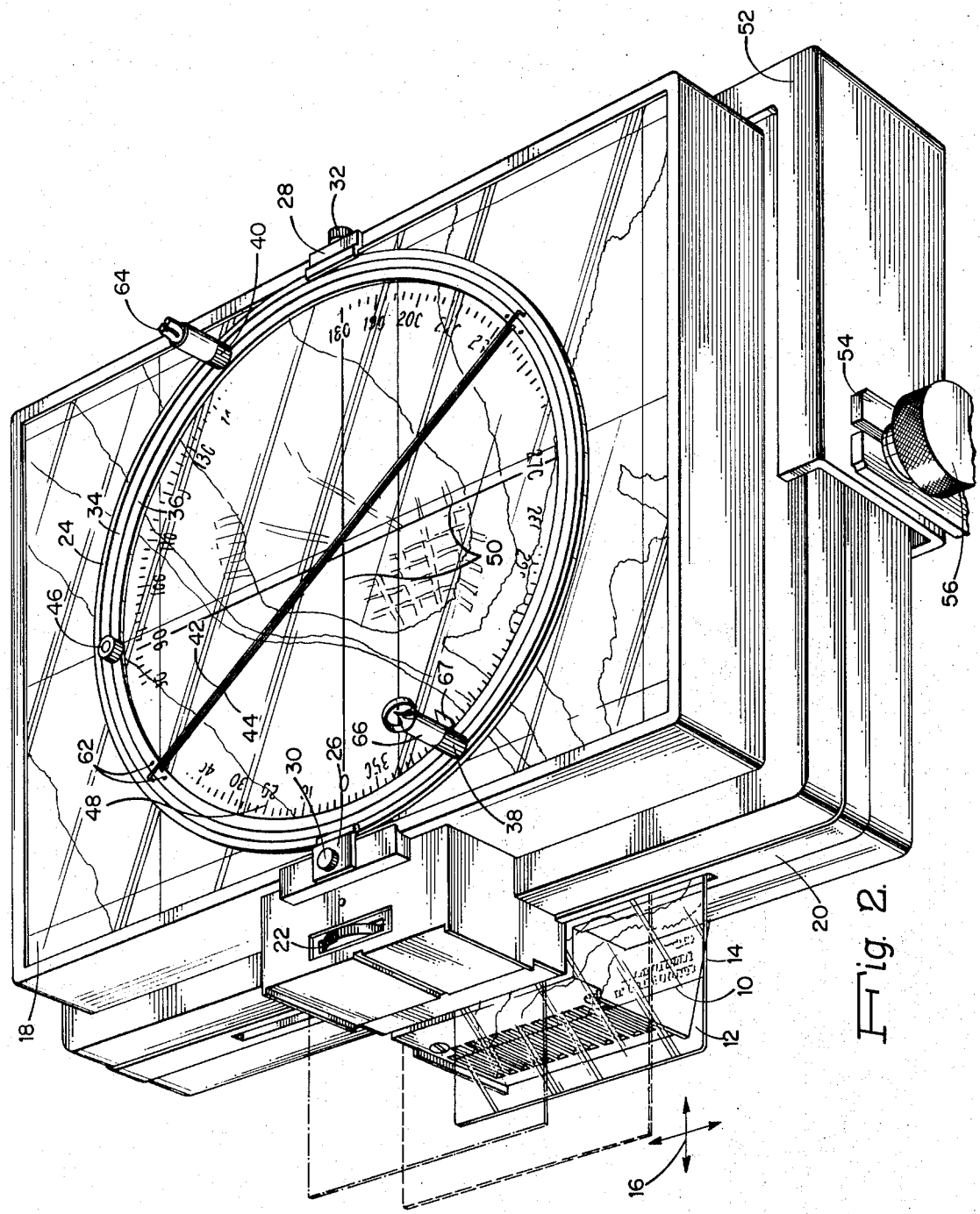
FIG. 2 is a pictorial view of the apparatus according to the invention disposed for use as a pelorus.

Referring to FIGS. 1 and 2, there is shown apparatus especially adapted for navigation by use of a projected microfiche version of a navigation chart such as a nautical chart. The chart is contained in one or more frames of a microfiche 10 contained between first and second transparent flexible carriers 12 and 14 which are manually movable along mutually orthogonal axes, as indicated by arrows 16, to position intended portions of the projected image on a screen 18. The screen is disposed on one side of a generally rectangular housing 20 which includes an illumination source and associated optics for projecting the images from fiche 10 onto screen 18. The projection apparatus is itself well-known and need not be described in any detail herein. In general, such projection apparatus includes a light source disposed on one side of an aperture in which the position of the fiche to be projected is disposed, condensing and enlarging lenses, and one or more mirrors providing a folded optical path within the housing for projection of the image at a selected magnification onto the rear surface of the viewing screen. Focusing of the projected image can be accomplished by a suitable control such as a focus knob 22 operative in any well-known manner to adjust the focal length to provide a clear projected image on screen 18. The light source and any associated cooling apparatus which may be provided can be energized from either an AC or DC source depending on the particular lamp employed and available power source. The housing 20 is typically formed of impact and corrosion resistant plastic material having a typical screen size of 9 by 11 inches. The entire unit typically weighs less than 10 pounds and is by reason of its small size and light weight readily transportable.

A course indicator assembly is provided on screen 18 and comprises an annular ring 24 of channel-shaped cross section disposed on the viewing surface of screen 18 by any suitable means such as by clamping plates 26 and 28 and respective mounting screws 30 and 32 fastened to housing 20. The ring 24 typically has a diameter substantially equal to the width of screen 18 and is oriented with its center at substantially the center of the viewing screen. Disposed for independent rotation within the annular channel of ring 24 are first and second rings 34 and 36, each of which are rotatable by a respective knob 38 and 40. First and second source indicators 42 and 44 are mounted to respective rings 34 and 36 and are diametrically disposed with respect to their mounting rings for movement therewith. A locking screw 46 is connected to the ring assembly and is operative to clamp rings 34 and 36 together for unitary rotation. A predetermined angular disposition between indicators 42 and 44 can thereby be maintained for reasons to be presently explained. A compass rose 48 is provided as a series of course markings on the face of screen 18 adjacent the inner periphery of the ring assembly. Vertical and horizontal cross lines 50 are also provided on the face of screen 18, as illustrated, to denote the major cardinal positions.

The housing 20 is contained within a supporting frame 52 which, in turn, is typically supported by a generally U-shaped mounting bracket 54 by means of knobs 56 and 58 which are threadably adjustable to permit angular adjustment of housing 20 about the axis defined between knobs 56 and 58. The mounting bracket 54 is attachable to a supporting structure by means of a mounting plate 60 and which is rotatable with respect to bracket 54 by means of an adjusting knob 62.

In use, the microfiche image projected on screen 18 is easily aligned by visually aligning the coordinate lines of the chart parallel to the cross lines 50 on the screen. The projected chart can be manually positioned by means of fiche holders 12 and 14 and, typically, the position of the vessel on board which the invention is employed is disposed at the center of compass rose 48 such that bearings can be directly taken from the compass rose. The magnetic variation between magnetic and true north for the particular charted area of interest can be preset by appropriate angular adjustment between indicators 42 and 44 such that one indicator denotes magnetic heading while the other denotes true heading. A pair of openings 62 can be provided at each end of indicator 44 through ring 36 to permit illumination of the openings by the light from screen 18 to thereby provide a visual delineation of indicator 44 from indicator 42 for use especially during night operation. With the present position of the vessel at the center of compass rose 48, any bearing can be found by moving the course indicator, either magnetic or true depending on the nature of the bearings desired, to lie over the location to be reached and then noting the reading of the intended bearing on the compass rose. Reciprocal bearings are also immediately visible by reading the opposite end of the desired indicator line.

A major feature of the invention is that the projected chart can be horizontally disposed and the ring assembly employed in conjunction with the compass rose as a pelorus to take visual sightings in direct relation to charted position. The screen 18 is shown in horizontal disposition in FIG. 2. The north-south axis of the compass circle is aligned parallel to the keel of the vessel for pelorus use, and sights 64 and 66 are provided across a diameter of the ring assembly. A pointer 67 is provided to indicate azimuth angle. In the embodiment shown, sights 64 and 66 are associated with knobs 38 and 40 and can be integral with these knobs or separate elements attachable thereto. Indicators 42 and 44 are aligned on a common axis to dispose sights 64 and 66 diametrically with respect to the compass rose, for pelorus use. The projected chart is usually at a magnification to provide full scale reproduction of the chart employed and which thereby allows navigational computations to be readily made directly from the display screen. Course lines can be marked on the screen, for example, by a grease pencil and distances can be measured directly on the projected chart by a rule or a divider just as would be accomplished with a conventional printed version of a chart. The invention may also be employed in taking radio-direction bearings.

A pointer 70, shown in FIG. 1, can be provided to indicate on the compass rose, the apparent wind direction on board a sailing craft. The pointer can be attached to ring 24 such as by a spring clip which is manually moveable to intended positions about the compass circle. Such wind indication is especially useful along with course indication to present a display of wind direction in relation to desired course for example to permit maximum usage of wind.

Persons familiar with the art of piloting and navigation will easily appreciate the various operations achievable by the invention and instruction herein as to detailed usage thereof is therefore not needed. It will be appreciated that various modifications and alternative implementations of the invention can be made without departing from the true scope of the invention. Accordingly, it is not intended to limit the invention by what has been particularly shown and described except as indicated in the appended claims.

What is claimed is:

1. A microfilm navigation system for use with a microfilm version of a navigation chart comprising:
   a viewing screen;
   means for projecting at least a portion of said microfilm chart onto said viewing screen;
   navigation means on said viewing screen and operative in association with the displayed chart on said screen to enable navigation directly on said displayed chart, including
   a compass rose on said viewing screen;
   first and second course indicators each independently rotatable relative to said compass rose and concentrically therewith; and
   sight means attached to said at least one course indicator and operative with said viewing screen in horizontal disposition, as a pelorus to take bearings in relation to said compass rose and to said displayed chart; and
   means for positioning said displayed microfilm chart at a selected position with respect to said navigation means.

2. A system according to claim 1 including:
   means for locking said first and second indicators in predetermined angular disposition for unitary rotation relative to said compass rose.

3. A system according to claim 2 wherein at least one of said indicators has indicia associated therewith to distinguish that indicator from the other.

4. A system according to claim 2 wherein at least one of said indicators includes at least one opening provided at each end of said indicator, said openings being illuminated by light from said viewing screen to distinguish said indicator from the other.

5. A system according to claim 1 wherein said viewing screen includes cardinal lines on said screen and operative to aid in visual alignment of said microfilm chart displayed on said screen.

6. A system according to claim 1 wherein said navigation means further includes:
   a ring assembly on said viewing screen and concentric with said compass rose; and wherein
   said at least one course indicator is disposed along a diameter of said ring assembly and rotatable in relation thereto.

7. A system according to claim 1 further including a wind direction indicator moveable with respect to said compass rose for manual adjustment to denote apparent wind direction.

* * * * *